(12) United States Patent
Mumic et al.

(10) Patent No.: US 12,242,659 B2
(45) Date of Patent: Mar. 4, 2025

(54) METHOD FOR DATA MANIPULATION DETECTION OF NUMERICAL DATA VALUES

(71) Applicant: LEGITARY GMBH, Vienna (AT)

(72) Inventors: Nermina Mumic, Vienna (AT); Peter Filzmoser, Vorau (AT); Günter Loibl, Tulln an der Donau (AT)

(73) Assignee: Legitary GmbH, Vienna (AT)

( * ) Notice: Subject to any disclaimer, the term of this patent is extended or adjusted under 35 U.S.C. 154(b) by 187 days.

(21) Appl. No.: 18/042,320

(22) PCT Filed: Jul. 23, 2021

(86) PCT No.: PCT/AT2021/060258
§ 371 (c)(1),
(2) Date: Feb. 21, 2023

(87) PCT Pub. No.: WO2022/036378
PCT Pub. Date: Feb. 24, 2022

(65) Prior Publication Data
US 2023/0315911 A1   Oct. 5, 2023

(30) Foreign Application Priority Data

Aug. 19, 2020 (AT) .............................. A 60257/2020
Jun. 2, 2021 (AT) .............................. A 50452/2021

(51) Int. Cl.
*G06F 21/64* (2013.01)
*G06F 11/36* (2006.01)
*G06F 11/3668* (2025.01)

(52) U.S. Cl.
CPC .......... *G06F 21/64* (2013.01); *G06F 11/3688* (2013.01)

(58) Field of Classification Search
CPC ....... G06F 21/64; G06F 11/3688; G06F 21/10
See application file for complete search history.

(56) References Cited

U.S. PATENT DOCUMENTS

| 7,937,321 B2 * | 5/2011 | Hoefelmeyer ..... G06Q 30/0185 |
| | | 705/318 |
| 10,536,482 B2 * | 1/2020 | Gabaev ............... H04L 63/1425 |

(Continued)

FOREIGN PATENT DOCUMENTS

WO    2018211060 A1    11/2018
WO    WO-2019215729 A1 *    11/2019

OTHER PUBLICATIONS

Badal-Valero Elena et al, "Combining Benford's Law and machine learning to detect money laundering. An actual Spanish court case", Forensic Science International, Elsevier B.V, Amsterdam, NL, vol. 282, Nov. 11, 2017 (Nov. 11, 2017), pp. 24-34, XP085313369 DOI: 10.1016/J.FORSCIINT.2017.11.008 external ink ISSN:0379-0738, Sections 3 and 4, https://link.springer.com/content/pdf/10.1007/s10260-021-00582-6.pdf.

(Continued)

*Primary Examiner* — Michael R Vaughan
(74) *Attorney, Agent, or Firm* — Laurence A. Greenberg; Werner H. Stemer; Ralph E. Locher

(57) ABSTRACT

A method for data manipulation detection of numerical data values uses a testing device. A Benford vector is ascertained from the frequencies expected, according to the Benford's distribution, for predefined initial number groups in a transformation unit by use of a composition data transformation that reproduces the frequencies in relation to one another. A random number generator is repeatedly used to generate randomly distributed numerical values, and multiple simulation vectors are ascertained from the frequencies of the initial number groups of the randomly distributed numerical values by the transformation unit. A detection unit is used to ascertain a simulation deviation from the Benford vector for each simulation vector and to store it in a memory, after which a group of numerical data values is read in via an (Continued)

input interface. A test vector and a test deviation of the test vector are ascertained by the transformation unit.

6 Claims, 1 Drawing Sheet

(56) References Cited

U.S. PATENT DOCUMENTS

| | | | |
|---|---|---|---|
| 11,507,961 B2* | 11/2022 | Scavotto | G06F 17/18 |
| 2006/0287947 A1* | 12/2006 | Toms | G06Q 40/08 |
| | | | 705/38 |
| 2008/0172264 A1* | 7/2008 | Hoefelmeyer | G06Q 30/06 |
| | | | 705/35 |
| 2008/0208946 A1 | 8/2008 | Boritz et al. | |
| 2014/0006468 A1* | 1/2014 | Kossovsky | G06Q 40/00 |
| | | | 708/517 |
| 2015/0046181 A1* | 2/2015 | Adjaoute | G06Q 10/10 |
| | | | 705/2 |

OTHER PUBLICATIONS

Mumic, Nemina et al., A multivariate test for detecting fraud based on Benford's law, with application to music streaming data. Jul. 27, 2021; Stat Methods Appl 30; 819-840 (2021). https://doi.org/10.1007/s10260-021-00582-6 relates to claims 1 to 4 (pp. 819-840—not relevant post-published.
Caio Da Silva Azevedo et al. A Benford's law based method for fraud detection using R Library Nov. 11, 2021; MethodsX, vol. 8, 2021, 101575; ISSN 2215-0161; https://doi.org/10.1016/j.mex.2021.101575 relates to claims 1 to 4 (pp. 1 to 10—not relevant post-published document.

* cited by examiner

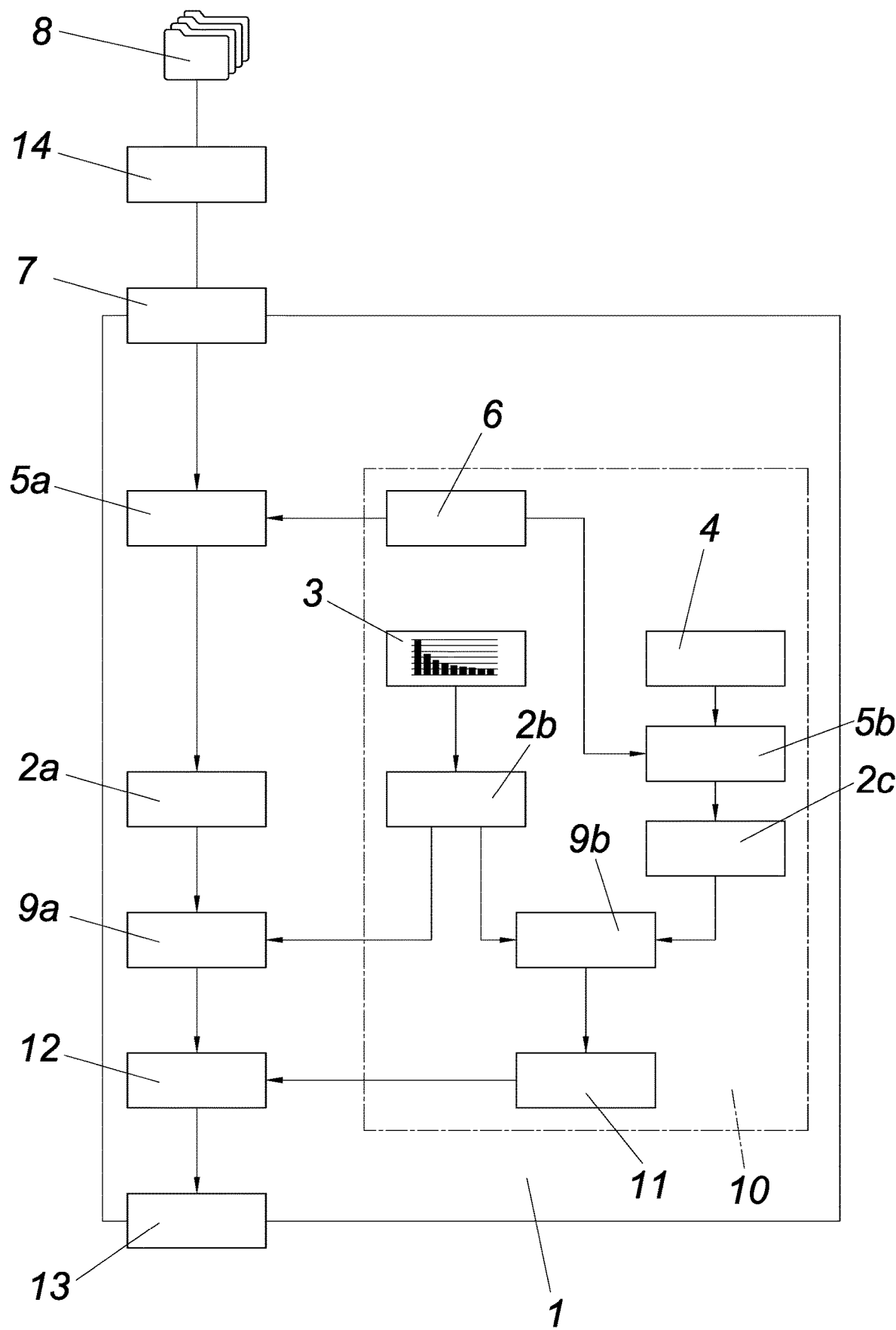

METHOD FOR DATA MANIPULATION DETECTION OF NUMERICAL DATA VALUES

FIELD AND BACKGROUND OF THE INVENTION

The invention relates to a method for detecting data manipulation of numerical data values, in particular of numerical access data in relation to media data streams, using a testing apparatus.

It is known practice to use the Benford test when testing the authenticity of numerical data values. The Benford test is based on the observation that, in the case of a dataset with a sufficiently large number of numerical values, the leading digit frequencies $b_j$ of the digits j=1, . . . , 9 are distributed differently, specifically in accordance with a Benford distribution $$b_j = \log(1 + \frac{1}{j})$$

If the numbers to be checked do not follow this Benford distribution, this indicates a manipulated dataset. A disadvantage of this, however, is that, as a prerequisite for using the Benford test, the datasets have to be of random origin, such that prior preselection or grouping of the datasets can corrupt the result. For this reason, the use of a classic Benford test for a method for detecting data manipulation of numerical data values, preselected from a large dataset, of a certain category or group, for example numbers of access operations to media data streams of an artist or a song title of a network, such as a streaming platform, is only suitable to a limited extent.

WO2018211060A1 discloses a method specifically for detecting data manipulation of preselected data values, which method compares related datasets from different networks, for example different streaming platforms, with one another. The numerical data values, which are to be compared, of the datasets, for example numbers of access operations to media data streams of a song title over a certain time period, are in this case subjected to a composition data transformation. Assuming that the data values of different networks behave in a similar way over the same time period, irregularities in this similarity behavior with respect to one another indicate a manipulation. A disadvantage of this, however, is that a relatively specific dataset, which consists of data values of at least three different networks for the same observation time period, is already necessary for this data manipulation detection. Accordingly, data manipulation detection can only be performed for networks for which there are also at least two reference networks that behave in a similar way with respect to the data stream behavior.

SUMMARY OF THE INVENTION

The invention is therefore based on the object of proposing a data manipulation detection method that is resource-saving, can be carried out quickly, and gives a valid indication about potential data manipulations of data values assigned to groups independently of the degree of conditioning, and substantially independently of the scope, of the dataset, without being reliant on data values from reference networks.

The invention achieves the stated object by virtue of the fact that a Benford vector is initially ascertained from the frequencies, expected in accordance with the Benford distribution, of predefined leading digit groups in a transformation unit of the testing apparatus by way of a composition data transformation that maps the frequencies in relation to one another, randomly distributed numerical values are generated repeatedly using a random number generator of the testing apparatus and a plurality of simulation vectors are ascertained from the frequencies of the leading digit groups of the randomly distributed numerical values by way of the transformation unit, a simulation deviation from the Benford vector is ascertained for each simulation vector by means of a detection unit and is stored in a test memory of the testing apparatus, after which a group of numerical data values is read in via an input interface of the testing apparatus, a test vector from the frequencies of the leading digit groups in the numerical data values of the groups by way of the transformation unit, and a test deviation of the test vector from the Benford vector is ascertained by the detection unit, after which the relative number of those stored simulation deviations that are greater than the test deviation is ascertained by way of a testing unit of the testing apparatus, and a positive manipulation value is output via an output interface if the relative number falls below a predefined threshold value.

The invention is based on the consideration that a Benford test only has an insufficient accuracy for detecting manipulations for preselected groups of numerical data values because, on the one hand, the number of numerical data values can be relatively small and, on the other hand, the data values do not necessarily display a natural growth behavior. In particular, this results in the difficulty that, for a technical application, the limit value for a permissible deviation from the Benford distribution is unknown.

As a result of the features according to the invention, this difficulty can be overcome by virtue of the expected deviation of the frequencies of the leading digit groups of a preselected group of numerical data values from a Benford distribution being ascertained on the basis of the simulation with randomly distributed numerical values, and a test deviation T, which is the maximum permissible for the data manipulation detection, for the numerical data values to be checked being derived therefrom. Furthermore, the provision of a composition data transformation for the frequency of predefined leading digit groups affords the significant advantage that is not the frequencies of the leading digit groups per se that are taken into consideration in the checking, but rather the ratios thereof in relation to one another. The composition data transformation according to the invention therefore increases manipulation security because, even in the case of frequencies of the leading digit groups that are within an acceptable range per se, a manipulation can be detected if only the ratios thereof in relation to one another change. By way of example, such a composition data transformation can be a transformation of a vector of frequencies of the predefined leading digit groups into pivot coordinates. On account of the composition data transformation and on account of the fact that a large number of simulation vectors $\bar{z}_{bi}$ mapping the frequencies of the leading digit groups of a group of random numbers and the simulation deviation $T_i$ thereof from a Benford distribution have to be determined for a valid data manipulation detection, the simulation is computationally intensive and therefore time consuming. A significant advantage of the invention is therefore that, following the simulation, the simulation deviations $T_i$ are stored in a test memory of a testing apparatus such that numerical data values to be checked subsequently can be checked for potential manipulations in a resource-saving manner without carrying out simulations and without the need for comparison datasets.

A first computationally intensive step is therefore carried out without the data values to be checked. To this end, a frequency vector $\bar{b}$ is initially determined, which maps the frequency $(b_1, \ldots, b_D)$, which is to be expected in accordance with a Benford distribution $$b_j = \log(1 + \frac{1}{j})$$

of predefined leading digit groups, for example the first digits 1-9

$$\bar{b} = (b_1, \ldots, b_9) = (\log(1 + \frac{1}{1}), \ldots, \log(1 + \frac{1}{9}))$$

or the first digits 10-99, $$\bar{b} = (b_{10}, \ldots, b_{99}) = (\log(1 + \frac{1}{10}), \ldots, \log(1 + \frac{1}{99}))$$

of each numerical value. The dimension D of the frequency vector $\bar{b}$ is accordingly dependent on the number of predefined leading digit groups. In principle, the selection of leading digit groups can be arbitrary, but each data value to be checked has to contain a leading digit group, and so there are corresponding restrictions for the possible choice of leading digit groups depending on the data values.

The frequency vector $\bar{b}$ is transformed into a Benford vector by way of a transformation unit of the testing apparatus by means of composition data transformation $$\bar{z}_b = (z_1, \ldots, z_{D-1})$$

as a result of which the relationships of the frequencies, mapped by a frequency vector, of the digits with respect to one another are described in order to subsequently improve the manipulation detection. In the composition data transformation, the dimension D of the Benford vector $\bar{z}_b$ is reduced by 1, in which, by way of example, one component of the vector is expressed by the other components and the known total sum of all the components. Normalization of the vector is generally required for this purpose. In addition to ascertaining the Benford vector $\bar{z}_b$, a multiplicity $N_s$ of, for example 1000-1000000, preferably 10000-100000, sets of randomly distributed numerical values is ascertained, for which the frequencies of the selected leading digit groups for each set are combined in a frequency vector $\bar{b}_i$ and a simulation vector $\bar{z}_{bi}$ is created therefrom by way of the transformation unit. If the randomly distributed numerical values are uniformly distributed, the leading digit groups for each set in principle follow the Benford distribution, but in some cases deviate therefrom with a certain degree of error, in exactly the same way as is also to be expected for the data values to be checked. The simulation vectors $\bar{z}_{bi}$ accordingly also deviate from the Benford vector $\bar{z}_b$. At the conclusion of the computationally intensive step, a simulation deviation $T_i$ from the Benford vector $\bar{z}_b$ is ascertained for each simulation vector $\bar{z}_{bi}$ by means of a detection unit and is stored in a test memory of the testing apparatus. This first step does require a large amount of computational power, but the stored simulation deviations $T_i$ can be used to check any numerical data values that follow a sufficiently similar random distribution.

To this end, in a second step that is resource-saving and therefore can be carried out quickly, the data values to be checked are read in via an input interface of the testing apparatus, as a result of which a frequency vector $$\bar{x} = (x_1, \ldots, x_D)$$

is generated with the aid of a counting unit in an analogous manner from the frequencies $(x_1, \ldots, x_D)$ of the selected leading digit groups, for example the leading digits 1-9, of the data values. This frequency vector $\bar{x}$ is subjected to a composition data transformation with the aid of the transformation unit, as a result of which a test vector $$\bar{z} = (z_1, \ldots, z_{D-1})$$

is generated. A test deviation T between the test vector z and the Benford vector $\bar{z}_b$ is then ascertained by the detection unit.

In a final step, a testing unit of the testing apparatus ascertains the relative number p of those stored simulation deviations $T_i$ that are greater than the test deviation T.

$$p = \frac{\{T_i > T, i = 1, \ldots, N_s\}}{N_s}$$

If this relative number p falls below a predefined threshold value, a positive manipulation value for the data values read in via the input interface is output via an output interface.

The manipulation detection of numerical data values of a total dataset, for example of the total numbers of access operations to all the media data streams of a network, already offers advantages, but in practice it is relevant whether the data values of a certain category of this dataset have been manipulated. By way of example, it should therefore be checked as to whether the numbers of access operations to media data streams of a certain artist or a certain piece of music have been manipulated. It is therefore in the context of a time-efficient data manipulation detection and a data manipulation detection that can be adapted to varying checking requirements that categories are selected from a dataset of numerical data values assigned to different categories using a filter unit on the basis of predefined filter parameters, and the numerical data values allocated to the categories are transferred as a group to the input interface of the testing apparatus. It is this preselection that impairs reliable checking by way of the Benford test per se and only the measures according to the invention, in particular the simulation of a multiplicity of such possible groups, enable reliable manipulation detection without comparison values from other data sources having to be used.

A pivot coordinate transformation has been found to be a suitable composition data transformation of the transformation unit. For example, the transformation of a frequency vector $\bar{b}$ into the Benford vector $\bar{z}_b$ can accordingly take place for the individual vector components $z_j$ according to the formula $$z_j = \sqrt{\frac{D-j}{D-j+1}} \ln \frac{b_j}{\sqrt[D-j]{\prod_{k=j+1}^{D} b_k}} \text{ for } j = 1, \ldots, D-1$$

The transformation into the test vector $\bar{z}$ and into the simulation vectors $\bar{z}_{bi}$ takes place analogously. The use of the pivot coordinate transformation has the advantage that pivot coordinates are isometric and span an orthogonal vector space such that the deviation between such pivot coordinates can be determined in a particularly simple manner.

Multivariate methods can be used to ascertain the simulation deviations $T_i$ and the test deviation $T$ by way of the detection unit. To this end, the detection unit can, for an incoming vector $\bar{z}$, $\bar{z}_{bi}$, for example, output its Mahalanobis distance from the Benford vector $\bar{z}_b$.

This Mahalanobis distance between the simulation vectors $\bar{z}_{bi}$ and the Benford vector $\bar{z}_b$, or between the test vector z and the Benford vector $\bar{z}_b$ can be calculated using $$T_i = (\bar{z}_{bi} - \bar{z}_b)' D^{-1/2} R_k^{-1} D^{-1/2} (\bar{z}_{bi} - \bar{z}_b)$$

$$T = (\bar{z} - \bar{z}_b)' D^{-1/2} R_k^{-1} D^{-1/2} (\bar{z} - \bar{z}_b)$$

In this case, D is the diagonal matrix D=diag(S) of the covariance matrix S of the simulation vectors $\bar{z}_{bi}$. $R_k^{-1}$ is an inverse rank-reduced correlation matrix that can be transformed by eigenvalue decomposition of $$R = D^{-1/2} S D^{-1/2}$$

with $$R = GAG'$$

wherein G $(g_1, \ldots, g_k)$ is the eigenvector of R and A are the corresponding eigenvalues $a_1, \ldots, a_{D-1}$, to form $$R_k^{-1} = G_k A_k^{-1} G_k'$$

where $G_k = (g_1, \ldots, g_k)$ and $A_k^{-1} = \text{Diag}(1/a_1, 1/a_k)$ for k ∈ $\{1, \ldots, D-1\}$.

Since the term $D^{-1/2} R_k^{-1} D^{-1/2}$ in the calculation of $T_i$ and T is only dependent on the simulation vectors $\bar{z}_{bi}$, this can likewise take place independently of the data values to be checked and stored in the test memory. The use of a rank-reduced correlation matrix $R_k^{-1}$ in this case affords the advantage that the manipulation test can be carried out for subsequent groups of data values in a particularly resource-saving manner and therefore quickly because it allows the required computation operations in each test step to be significantly reduced. In particular, a rank reduction by a factor of 10-30 is proposed according to the invention, wherein good results can be achieved with a correlation matrix $R_k^{-1}$ of a rank k of from 3 to 10, preferably of 3 or 4.

BRIEF DESCRIPTION OF THE DRAWING

The subject matter of the invention is illustrated, by way of example, in the drawing. The drawing shows a schematic flowchart of the method according to the invention.

DETAILED DESCRIPTION OF THE INVENTION

A method, according to the invention, for detecting data manipulation of numerical data values is carried out by a testing apparatus 1 that comprises a transformation unit 2a, b, c. A transformation unit 2b in this case receives data streams from a Benford memory 3 on which frequency vectors $\bar{b}$, which map the frequency, which is to be expected in accordance with a Benford distribution $$b_j = \log(1 + \frac{1}{j})$$

of predefinable leading digit groups $(b_1, \ldots, b_D)$, are stored. If the first digits 1 to 9 are selected as the leading digit group $(b_1, \ldots, b_D)$, the Benford vector is therefore $$\bar{b} = (b_1, \ldots, b_9) = \left(\log\left(1 + \frac{1}{1}\right), \ldots, \log\left(1 + \frac{1}{9}\right)\right)$$

A transformation unit 2c receives data streams from a random number generator 4 that generates sets of randomly distributed numerical values. A counting unit 5b ascertains the number of leading digit groups, predefined in a memory 6, in the randomly distributed numerical values and outputs $N_s$ random vectors $\bar{b}_i$ (i=1 … $N_s$) therefrom, which map the frequencies of the predefined leading digit groups of the randomly distributed numerical values. By way of example, $N_s$ can be 1000-100000. The values $10^{ul}$ can be used as randomly distributed numerical values, wherein ul are random numbers from a uniform distribution, and l=1, …, N, wherein N, for example, can be selected to be of the same magnitude as $N_s$. This makes it possible to ensure that $N_s$ sets of N numerical values are generated, wherein the number of leading digit groups follows the Benford distribution with deviations. A transformation unit 2a receives data values of a dataset 8, wherein a frequency vector $$\bar{x} = (x_1, \ldots, x_9)$$

is generated from the frequencies of the leading digit groups $(x_1, \ldots, x_D)$ of the data values via a counting unit 5a, wherein the components represent the frequencies of the leading digit groups. If, for example, 183 data values begin with the digit 1, 93 data values with the digit 2, etc., it can be the case that $x_1$=183, $x_2$=93, etc.

The transformation units 2a, 2b, 2c process the frequency vectors $\bar{x}$, $\bar{b}$, $\bar{b}_i$ (i=1 … $N_s$) and carry out a composition data transformation for each vector, as a result of which the frequencies, represented by the coordinates of the frequency vectors $\bar{x}$, $\bar{b}$, $\bar{b}_i$ (i=1 … $N_s$), of the leading digit groups are related to one another. This can be carried out by way of transformation into pivot coordinates.

A detection unit 9a receives the data streams of the transformation unit 2a, 2b and then ascertains one of the test deviations T between the test vector $\bar{z}$ and the Benford vector $\bar{z}_b$. A detection unit 9b receives the data streams of the transformation unit 2b, 2c and then ascertains one of the simulation deviations $T_i$ between the simulation deviations $T_i$ (i=1, …, $N_s$) and the Benford vector $\bar{z}_b$. A testing apparatus according to the invention can comprise one or more transformation units 2a, 2b, 2c and one or more detection units 9a, 9b. A plurality of transformation units 2a, 2b, 2c and a plurality of detection units 9a, 9b are shown in the drawing for better illustration of the data flows. The same applies to the counting units 5a and 5b. Multivariate methods can be used to ascertain the simulation deviations $T_i$ and the test deviation T by way of the detection unit 9a, 9b. By way of example, calculating the Mahalanobis distance between the simulation vectors $\bar{z}_{bi}$ and the Benford vector $\bar{z}_b$ or between the test vector z and the Benford vector $\bar{z}_b$ is suitable for this purpose.

Since the method steps for obtaining the simulation deviations $T_i$ (i=1, …, $N_s$) can be carried out independently of the dataset 8 to be checked, these time-intensive steps can be carried out in advance in a region 10 and the simulation deviations $T_i$ (i=1, ..., $N_s$) can be stored in a test memory 11.

A testing unit 12 can access the simulation deviations $T_i$ stored on the test memory 11 and ascertains the relative number of those stored simulation deviations $T_i$ that are greater than the test deviation T received from the detection unit 9a. If the relative number p $$p = \frac{\{T_i > T, i = 1, \ldots, N_s\}}{N_s}$$

falls below a certain threshold value, for example 0.05, a positive manipulation value is output by an output interface 13.

By way of example, a p value of p=1 means that all the simulation deviations $T_i$ are greater than T. In this case, the leading digit groups of the numerical data values are Benford-distributed, which indicates an unmanipulated dataset. In contrast, a significantly lower p value indicates data manipulation.

A filter unit 14 can be connected upstream of the input interface 7, which filter unit selects categories from a dataset 8 of numerical data values assigned to different categories on the basis of predefined filter parameters, and transfers only those numerical data values allocated to the selected categories as a group to the input interface 7. This makes it possible to check only part of the dataset, as a result of which, for example, just certain aspects, such as the numbers of access operations to media data streams of a certain artist, can be checked.

The invention claimed is:

1. A method for detecting data manipulation of numerical data values using a testing apparatus, which comprises the steps of:

initially ascertaining a Benford vector from frequencies, expected in accordance with a Benford distribution, of predefined leading digit groups in a transformation unit of the testing apparatus by way of a composition data transformation in a form of an isometric composition data transformation that maps the frequencies in relation to one another;

generating repeatedly randomly distributed numerical values using a random number generator of the testing apparatus and a plurality of simulation vectors being ascertained from the frequencies of the predefined leading digit groups of the randomly distributed numerical values by way of the transformation unit that carries out a same said composition data transformation as for the frequencies of the predefined leading digit groups;

ascertaining a simulation deviation from the Benford vector for each of the simulation vectors by means of a detection unit and being stored in a test memory of the testing apparatus;

subsequently reading in a group of numerical data values via an input interface of the testing apparatus;

ascertaining a test vector from the frequencies of the predefined leading digit groups in the numerical data values of the group by way of the transformation unit, and ascertaining a test deviation of the test vector from the Benford vector by the detection unit;

subsequently ascertaining a relative number of stored simulation deviations that are greater than the test deviation by way of a testing unit of the testing apparatus; and outputting a positive manipulation value via an output interface if the relative number falls below a predefined threshold value.

2. The method according to claim 1, which further comprises selecting categories from a dataset of the numerical data values assigned to different categories using a filter unit on a basis of predefined filter parameters, and the numerical data values allocated to the categories are transferred as a group to the input interface of the testing apparatus.

3. The method according to claim 1, wherein the composition data transformation of the transformation unit is a pivot coordinate transformation.

4. The method according to claim 1, wherein the detection unit, for an incoming said test vector, outputs its Mahalanobis distance from the Benford vector.

5. The method according to claim 1, wherein the numerical data values are numerical access data in relation to media data streams.

6. The method according to claim 1, wherein the isometric composition data transformation is a pivot composition data transformation.

* * * * *